(12) United States Patent
Candelore et al.

(10) Patent No.: US 7,726,579 B2
(45) Date of Patent: Jun. 1, 2010

(54) IN-CHASSIS TV CHIP WITH DYNAMIC PURSE

(75) Inventors: Brant Candelore, San Diego, CA (US); Koichi Oshima, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 92 days.

(21) Appl. No.: 12/062,786

(22) Filed: Apr. 4, 2008

(65) Prior Publication Data

US 2009/0179078 A1 Jul. 16, 2009

Related U.S. Application Data

(60) Provisional application No. 61/020,241, filed on Jan. 10, 2008.

(51) Int. Cl.
*G06K 19/06* (2006.01)
(52) U.S. Cl. .................. 235/492; 705/41; 725/110
(58) Field of Classification Search ............... 725/6, 725/134; 235/380
See application file for complete search history.

(56) References Cited

U.S. PATENT DOCUMENTS

| | | | | |
|---|---|---|---|---|
| 5,206,488 | A | * | 4/1993 | Teicher ................ 235/380 |
| 5,818,934 | A | * | 10/1998 | Cuccia ................ 380/216 |
| 6,105,008 | A | | 8/2000 | Davis et al. |
| 6,126,069 | A | * | 10/2000 | Stiefel et al. ........... 235/380 |
| 2001/0005840 | A1 | | 6/2001 | Verkama |
| 2001/0031656 | A1 | * | 10/2001 | Marshall et al. ........... 463/6 |
| 2003/0061605 | A1 | * | 3/2003 | Genevois et al. ........... 725/6 |
| 2004/0133923 | A1 | * | 7/2004 | Watson et al. ........... 725/134 |
| 2005/0147440 | A1 | * | 7/2005 | Nakanishi et al. ........ 400/62 |
| 2006/0026661 | A1 | * | 2/2006 | McMullin et al. ........ 725/127 |
| 2006/0174259 | A1 | * | 8/2006 | Kim ..................... 725/6 |
| 2007/0246530 | A1 | * | 10/2007 | Hashimoto et al. ........ 235/380 |
| 2008/0284610 | A1 | * | 11/2008 | Hunter .................. 340/657 |
| 2010/0057552 | A1 | * | 3/2010 | O'Leary et al. ........ 705/14.27 |

FOREIGN PATENT DOCUMENTS

| EP | 1264484 | 10/2006 |
|---|---|---|
| KR | 20020053186 | 7/2002 |
| WO | 0109851 | 2/2001 |

(Continued)

OTHER PUBLICATIONS

Ketai-l Archives, "(keitai-l) Re: Recharching DoCoMo felicia chips", http://www.appelsiini.net/keitai-l/archives/2004-08/0089.html, Aug. 10, 2004.

(Continued)

*Primary Examiner*—Thien Minh Le
*Assistant Examiner*—Sonji Johnson
(74) *Attorney, Agent, or Firm*—John L. Rogitz

(57) ABSTRACT

An IC with a purse is permanently mounted on the main motherboard of a TV and communicates with the main CPU. The purse chip holds electronic funds, and the user can, by means of OSDs, purchase content and services using the funds. The user can replenish the purse from time to time. The purse chip does not contain personal identifying information, so it facilitates transfer of ownership when a TV is sold and anonymous transactions.

12 Claims, 2 Drawing Sheets

FOREIGN PATENT DOCUMENTS

WO    0167403    9/2001

OTHER PUBLICATIONS

Werifone, "Smart Cards: The future of Electronic Payments", http://www.usamerchant.com/SmartCards.pdf, Aug. 1996.

Smart Card News Ltd., "Smart Card News Ltd", http://www.smartcard.co/uk/members/newsletters/1998/may98.pdf, Mat 1998, vol. 7, No. 5.

Wikipedia, "osaifu-Keitai", http://en.wikipedia.org/wiki/Osaifu-Keitai.

Innovonics, "PC Pay System", http://www./innovonics.com/pcpay/usage/home.html.

Broadcast Engineering, "Irdeto Access Introduces ICOB Conditional Access Module with Embedded Smart Card", Feb. 10, 2004.

Wireless Watch Japan, "Japan Mobile Internet Report "Carriers, Handsets, Content and Service" Mobile TV Embedded e-Coupon System".

Embedded Star, "Atmel Adds More Functionality to its 32K Smart Card AVR RISC Flash Microcontroller".

\* cited by examiner

OSD to reload Purse

OSD to Buy

IN-CHASSIS TV CHIP WITH DYNAMIC PURSE

This application claims priority to U.S. provisional application Ser. No. 61/020,241 filed Jan. 10, 2008.

FIELD OF THE INVENTION

The present invention relates generally to ICs embedded in the TV chassis that can be used as financial purses for paying for content and services.

BACKGROUND OF THE INVENTION

Credit cards with cryptographic CPUs, so called "financial smart cards", have not gained acceptance for e-commerce purposes in the United States. Credit cards with magnetic stripes dominate not only point-of-sale terminal transactions at retail outlets, but also Internet PC-based transactions from home. The PC's web browser uses SSL encryption to protect confidential information and credit card numbers given to on-line retailers.

Financial smart card readers have been built into TV set-top boxes in the past, but applications which took advantage of them never materialized. One of the problems was with the inconvenience of the built-in smart card reader. It is speculated that it may have been too troubling for home consumers to get up from the couch, find their wallet or purse, choose a credit card, and then walk over to the set-top box to insert the card into the reader. Because the interaction and menu screens were expected to take some time to complete, the user would need to either leave the card in the reader for a period of time or, in the case of a magnetic stripe card, swipe it at the right time. Then the user would typically need to go back to the couch to interact with some more on-screen displays (OSDs) before completing a purchase. And so use of financial smart cards or magnetic stripe credit cards may have been seen as inconvenient. And there was also the risk of forgetting about the card in the STB card slot when the customer left home.

Smart card or magnetic stripe readers built-in to TV remote controls have been suggested so that a user might stay seated on the couch. But the remote controls required reliable 2-way communication with the TV that didn't exist.

Set-top boxes (STBs), e.g. used with pay-TV services, use Conditional Access (CA). Usually a CA smart card is used with a card reader built-into the STB or a crypto CPU mounted on the STB motherboard is used. The smart card or crypto CPU insures that the customer pays for the broadcast audio visual content that is being watched—typically for a subscription to a certain type and number of channels. If a return channel is available, e.g. phone or Internet, Impulse-Pay-per-View (IPPV) may be available. If a 2-way back channel is available, e.g. in cable an out-of-band back-channel, then Video-on-demand (VOD) programming may be accessed. In the case of IPPV, content may typically be viewed speculatively. But then a reportback must be made of the programs watched for billing purposes. In the case of VOD, the smart card or cryptographic CPU is involved in securing the signal through encryption but is not involved with billing since the service operator already knows what VOD program was watched. The content that can be viewed is typically limited to a particular pay-TV service provider whose set-top box is being used to watch TV.

There are many small internet service providers that would like to charge a small amount of money for providing content or services. However, the current trend seems to be to pay for those by showing advertisements. It may be too difficult for a small internet service provider to successfully charge for content or services for the different reasons. In order to be able to charge, an account needs to be set-up which requires ID, password, credit or debit card information, billing address, and email address. The account information is often required by the credit card agencies or banks offering debit cards in order to combat fraud since the credit card and debit card numbers can be easily copied and used by others. And this information may be needed regardless of whether the account will be for a one time transaction or recurring transactions. The user is expected to spend some time and effort to type in all the information in the right fields. This is arduous enough with a PC, but with a TV with only a remote control, it is even more troublesome. The TV remote control typically only has up/down/left/right arrows and 10-key alpha-numeric keys. Alternatively, a soft keyboard can be shown on-screen or a keyboard, e.g. wireless Bluetooth or wireless USB enabled, may be interfaced with the TV. The soft keyboard is cumbersome to use, and the wireless keyboards are relatively expensive and not generally available.

There is reluctance for customers to give personal and financial information especially if they are not sure that they will like the content or service that is being provided. A fear customers have is that the personal information will be used misused, e.g. for identity theft purposes with many fraudulent charges, or that the email account provided will be spammed with unsolicited advertisements. The more service providers are given the email address, then the greater is the likelihood that the account will be spammed. When an email account is spammed, it is hard to know who the culprit was, and sometimes the only remedy is to close it down and replace it with another one with a different name. A spammed email account is therefore very annoying.

Another reason for anonymity is the purchase of adult programming. To prevent possible embarrassment, a person may not want to have adult movies associated with their account, e.g. listed on a credit card bill or service provider monthly bill.

FeliCa is a contactless smart card system developed by Sony. Edy is an electronic payment system using FeliCa as a stored value card. Some SonyEricsson phones include a FeliCa IC. These phones are used in a similar fashion as the contactless smart card version. At the point-of-sale terminal, like the card, the phone is waved over the contactless reader at the check-out counter. The purse on the FeliCa IC is cryptographically accessed and debited. Edy is presently used at convenience stores, at railway or bus stations to pay for tickets, and when connected to a PC, to pay for items on the Internet. The electronic purse on the FeliCa card or SonyEricsson phone can be recharged at special kiosks or through a banking website managed through a PC. When used with the PC, a USB2 wireless reader/writer is needed to interface to the FeliCa IC. FeliCa suffers from the same problems as a financial smart card or magnetic strip credit card when used in conjunction with a TV. The user must get up out of the couch and do something. The wireless reader adds significant complexity and integration cost to a set-top box or TV.

TVs are becoming Internet capable. In 2007, Sony announced the Bravia Internet Video Link (BVIL) which is a module that adds web browsing and content decoding to a Bravia TV. Due to its popularity, the module functionality will now be built into the TV in 2008.

There is a desire to allow users to purchase content such as music videos and movies from a multitude of Internet service providers as well as access online news and magazines from large number of on-line outlets—all of which may be consumed using the TV's online connection. By allowing viewers to easily use their TVs to make payments, the viewer may be given pay as well as ad supported content to choose from and the overall TV experience can be made more pleasant.

As understood herein, it is desirable to make TV viewing and content browsing as easy and convenient as possible for the viewer. The approach should minimize hardware complexity. Further, it is desirable under some circumstances to permit the viewer to make such purchases anonymously, without having to establish an account and to provide information such as name, credit or debit card data, PayPal account, email address, and the like.

SUMMARY OF THE INVENTION

A TV chassis has a motherboard with a CPU and an Internet connection. An IC with an electronic purse (purse chip) is permanently mounted on the motherboard. The purse chip is in communication with the main CPU. The CPU executes an e-commerce application that uses the Internet connection to communicate with a service provider's web server, client payment and fulfillment systems.

In one embodiment of the invention, when offers are presented and the user makes a selection and agrees to make a purchase, the purse chip is cryptographically debited. The debit can be cryptographically verified by the payment system. Once verified, the service provider's fulfillment system is enabled to provide streaming, downloading or viewing of the content. The TV is passed a link with a token to a URL where the content may be streamed or downloaded, e.g. using HTTP or HTTPS. Content may be sent DRM encrypted, in-the-clear, or encrypted real-time using Secure Socket Layer (SSL). DRM encryption may be important if the content is to be stored by the user. Exactly how the content is delivered, whether encrypted or in-the-clear, is not a focus of this invention. The purse chip makes it easy for the viewer to make "point and click" transactions in very TV-centric way. The viewer does not need to get up from the couch!

The purse chip can facilitate micro-payments where, for example, content or news article could be purchased for 5 or 10 cents. And a user can purchase content or services from web-based retailers where no previous relationship, except support for the purse chip, exists.

In one aspect of the invention, when accessing an Internet portal for content or services, a TV user is presented web pages with content or services to buy, and after a selection, options for payment, e.g. credit card (Visa, MasterCard, Discover, American Express), Pay Pal, or purse chip. In our case, the user selects "purse chip" which opens a dialogue with the website's payment system. In some implementations, the purse chip does not contain personal identifying information and is not tied to an individual. This facilitates purchases with the service provider without having to set-up an account. And when the TV is sold to someone else, the stored value on the purse chip can be easily determined through on-screen displays and paid for by the purchaser. The purse chip can be loaded when taken over by the new owner of the TV. The old owner will no longer "push" funds to that purse chip. By using the embedded chip as a "purse"—not as an embedded credit or debit card—overcomes a huge problem—possible misappropriation of someone else's credit or bank accounts The purse chip should be considered to be "cash". And the value is transferred when the TV is sold to another person.

In another aspect of the invention, the CPU presents OSDs allowing a viewer to replenish finds in the embedded purse chip. The funds on the purse chip embedded in the TV can be replenished over the Internet from a user's bank account. For security reasons, the replenishment may be implemented as a "push" from the user's bank account to a purse chip customer care website. The TV can be made to immediately or periodically cheek the website to see if funds are available for download to purse chip. If funds are available, the CPU interfaces with the server to receive a payload which is delivered to the purse chip. The purse chip cryptographically processes the payload to add electronic funds to its internal memory. The purse chip can acknowledge the funds reload transaction with a reply to the server.

In another aspect of the invention, for parental control and general access purposes, the owner of the TV can set a PIN code to access the purse chip. It is expected that the TV will be located in someone's home. Consequently, access to the purse chip will be limited to people having access to the household and the TV. The PIN code is stored local to the TV. The PUN can prevent children and people visiting the household from using the purse chip.

In another aspect of the invention, content is purchased using the purse chip and the content is downloaded from terrestrial broadcasters using the TV's tuner instead of the TV's Internet connection. The Internet connection is used for purse chip payment purposes. In related implementation, the content may be downloaded first, perhaps even speculatively, and the content is purchased afterwards.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
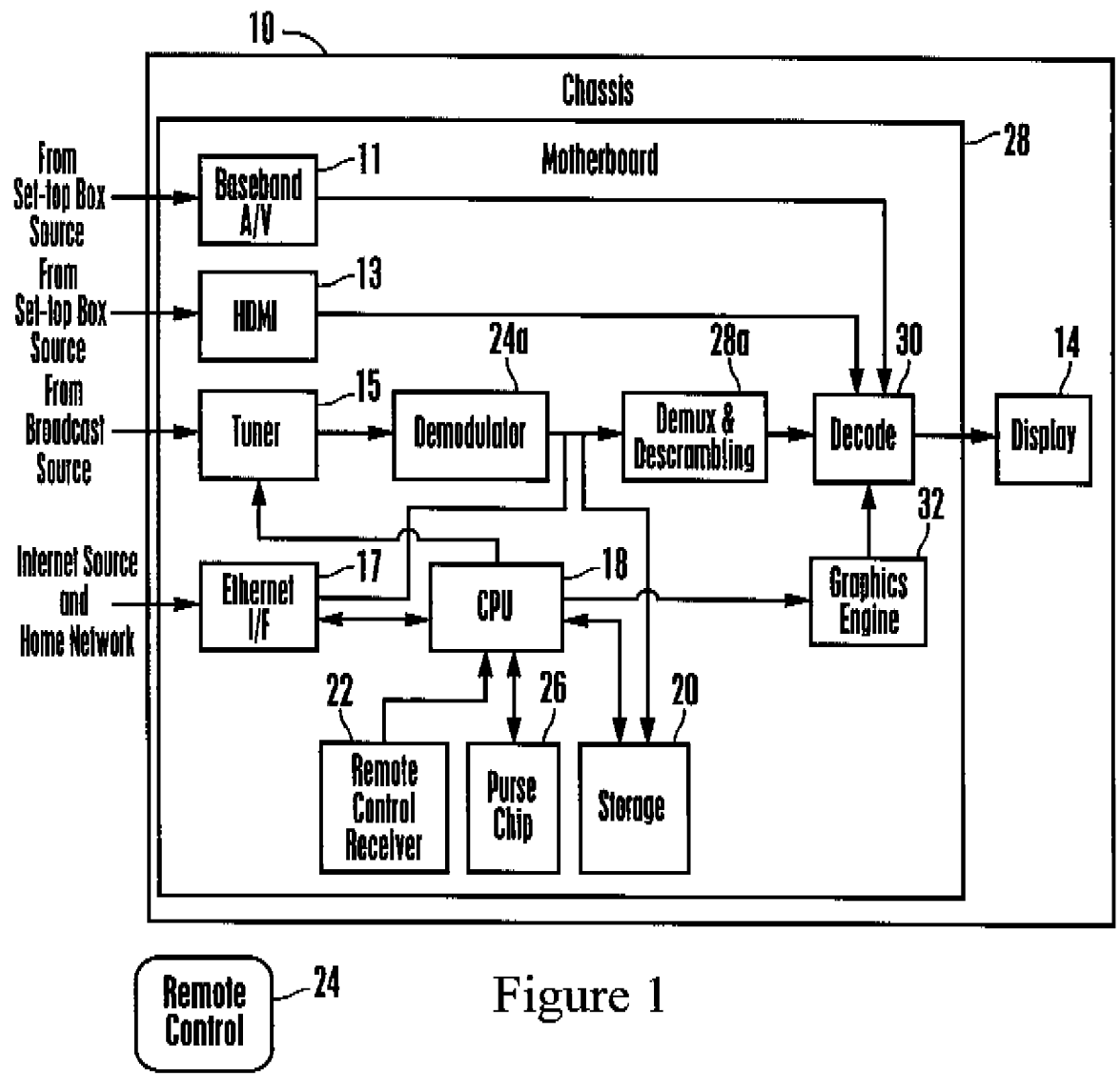
FIG. 1 is a block diagram of a non-limiting TV in accordance with present principles.

Referring initially to FIG. 1, a TV is shown, generally designated 10, that can include a TV chassis 12 holding a TV display 14 such as a flat panel LCD or OLED that can display video in standard definition or high definition as received from a tuner 15, analog baseband AV input 11, digital HDMI input 13, and IP interface 17. The CPU 18 can set the tuner's frequency to acquire a desired channel, or can switch inputs to one of the other inputs 11 and 13, Internet 17, or content stored in storage 20. Storage 20 can be any combination of RAM, FLASH or hard-disk drive (HDD). The CPU 18 can execute a program from storage 20 in accordance with principles set forth herein. The CPU 18 may receive user commands via IR or RF remote command receiver 22, which in turn receives wireless signals from a remote control device 24.

In accordance with present principles, the CPU 18 can communicate with a cryptographic IC configured as a digital purse for purchase transactions. The purse chip 26 is tamper-resistant IC that may have an on chip cryptographic CPU. The purse chip 26 is mounted in a permanent way on the same circuit board 28 as the CPU 18 as shown in FIG. 1. For security reasons, a ball grid array package may be selected for both the purse chip 26 and the CPU 18. The conductive path between the two devices can be instantiated using pins in the middle of the array, blind vias, and traces on internal layers of the printed circuit board to make probing difficult.

As discussed further below, the purse chip 26 electronically stores an amount of money. When offers are presented and the user makes a selection and agrees to make a purchase, the purse chip is cryptographically debited. The debit can be cryptographically verified by the payment system. Once verified, the service provider's fulfillment system is enabled to provide streaming, downloading or viewing of the content. The TV is passed a link with a token to a URL where the content may be streamed or downloaded, e.g. using HTTP or HTTPS. In some cases, the downloading may take place using the TV's tuner 15. Content may be sent DRM encrypted, in-the-clear, or encrypted real-time using Secure Socket Layer (SSL). Content may be recorded into storage 20.

The purse chip cannot be removed by owners. If the TV is sold to someone else, the purse chip will be transferred as well. Consequently, as currently envisioned, the purse chip is not strictly associated with a person as is currently the case with credit and debit cards. It contains no personal identification such as first and last names, address, email account, bank account number, or credit card information. It is anonymous. When the TV is about to be sold, the stored value can be checked, and that amount can be added to the cost of the TV 10.

The tuner 15 is controlled by a CPU 18 to tune to a desired channel. Interposed between the tuner 15 and the display 14 may be a demodulator 24a for demodulating the transport stream from the tuner 15, a demultiplexer 28a for extracting and optionally descrambling a desired program from the transport streams and a decoder 30 for decoding the program. Other inputs to the demultiplexer 28a are the Ethernet interface 17 and storage 20.

FIG. 1 illustrates that the CPU 18 may control a graphics engine 32 for, e.g., presenting the on-screen displays (OSDs) discussed above on the display 14. The CPU 18 may also receive Internet content from an Internet connection such as but not limited to an Ethernet interface 17. A purse chip 26 can be accessed by the CPU as shown in accordance with principles above.

In the system shown in FIG. 1, the purse chip 26 can be directly mounted on the same circuit board as the TV CPU 18. Communication between the purse chip and TV CPU may be by an international standards organization (ISO) protocol such as ISO7816. Communication between the CPU 18 and tuner 15 can be via I2C.

Figure 3:
FIG. 3 is a screen shot of an on-screen display (OSD) for replenishing the purse.

The purse chip may be updated via a standard bank account. The bank account can be configured to automatically reload the purse chip when it drops below a certain level of funds. FIG. 3 shows that in response to a menu selection as may be provided in accordance with TV menu provisioning principles, a GUI 36 can be presented on the display 14 that the user can navigate using the keys on the remote control device 24 or on the TV chassis itself. As shown, the GUI can indicate a current purse balance in a top line and then a second line can be provided with a space into which a viewer can input a desired amount of money to add to the purse chip. The third line enables a viewer to enter the number of an account such as a credit card account that should be debited the amount shown in the second line to be transferred to the purse chip. If desired, the transaction may be completed and the purse chip credited by the CPU with the amount shown in the second line of FIG. 3 only when debiting of the account has been verified.

In this regards the CPU 18 typically communicates via an uplink with e.g., an Internet or cable head end computer to communicate the account number for debiting and receive back verification in a downlink over the same channel that the account has been debited, prior to the CPU 18 resetting the purse amount in the purse chip. The uplink can be via cable or Internet connection, both of which are discussed in further detail below.

The purse may also be replenished by adding amounts to the purse when the viewer watches advertisements, or as rebates for meeting a threshold number of purchases.

Figure 4:
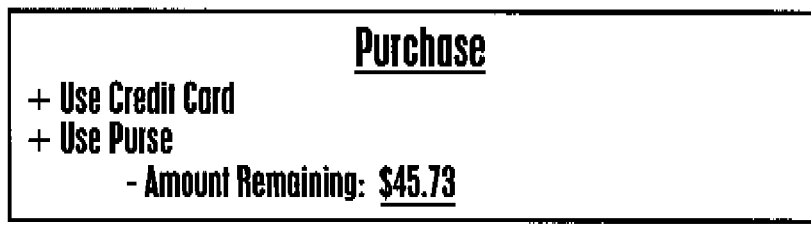
FIG. 4 is a screen shot of an OSD for allowing a user to purchase goods/content with the purse.

FIG. 4 shows a GUI 38 which enables a viewer to select an item for purchase. If the viewer selects "use purse" in the third line, an "amount remaining" in the purse chip may be displayed in the fourth line as shown. It is to be understood the particular non-limiting GUI 38 shown in FIG. 4 may be a lower level menu that is accessed by selecting an item from a list in an upper level menu. When "use purse" is selected, the CPU simply notifies the uplink computer that it may credit itself with the purchase amount using an electronic token, which can be used to append the amount as a charge on the a bill sent to the viewer.

Figure 2:
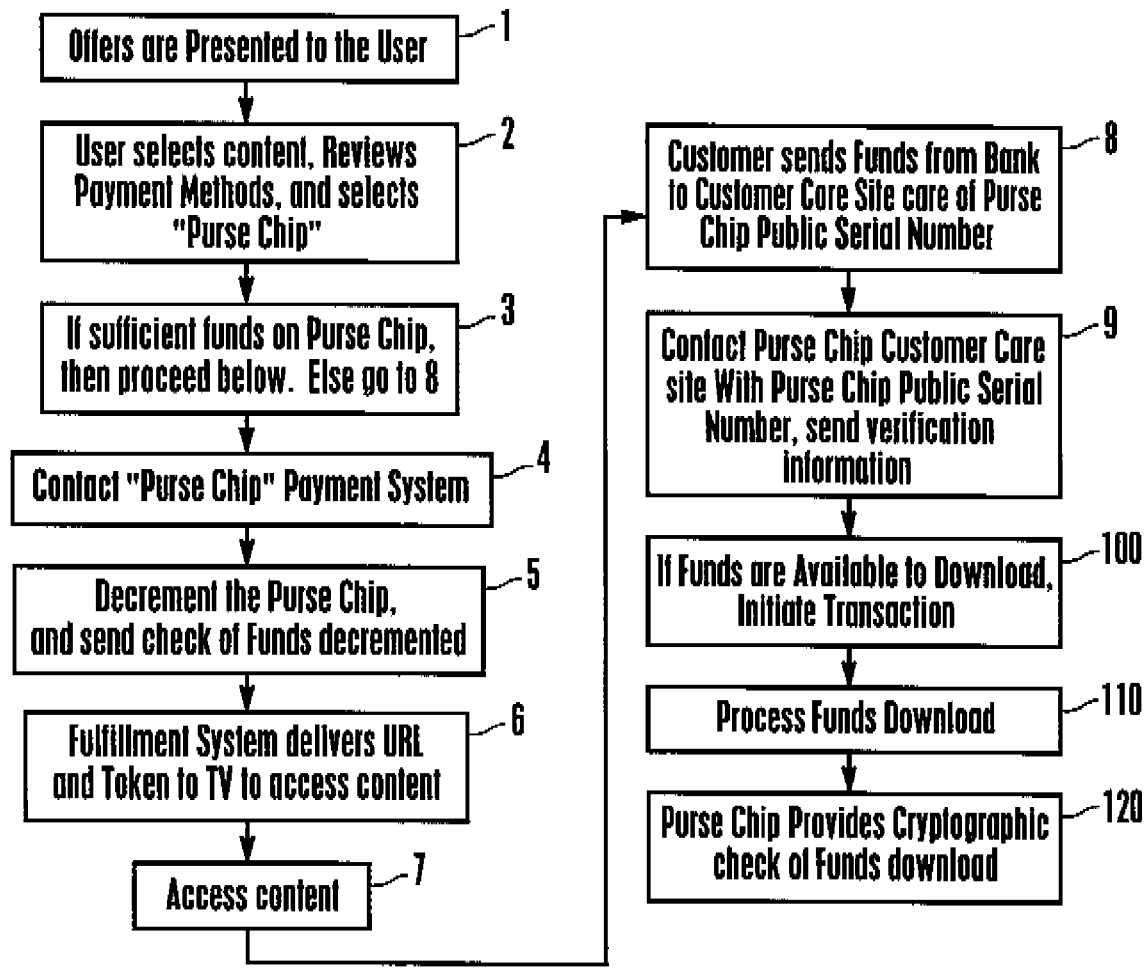
FIG. 2 is a flow chart of the logic that may be employed by the TV to replenish the onboard purse and to use the purse to make purchases.

Non-limiting logic is shown in FIG. 2. Initially, the purse chip may electronically record an initial monetary balance, which can be defaulted to zero. The user is presented offers for electronic commerce at block 1 on, e.g., the TV. At block 2 the user selects content using, e.g., the remote control device. To this end the GUI of FIG. 4 can be presented. If sufficient electronic funds exist on the purse chip for the purchase, the process moves to block 4 wherein the TV contacts a payment system such as can be embodied by an Internet server. At block 5 in response, the payment system cryptographically decrements the electronic balance of the purse chip accordingly. A notice can be sent to the user of the funds decremented. Then, at block 6 the purchased item is delivered to the TV, potentially by another Internet server referred to as a "fulfillment system" by, e.g., delivering an Internet address of the content along with a "bought" token to the TV. At block 7 the user accesses the Internet address using, e.g., the TV by appropriately manipulating the remote control and the TV presents the token to the server, which them permits the TV to play or store or otherwise access the content.

To load or replenish funds reflected in the electronic balance of the purse chip from, e.g., block 3 if insufficient funds exist, the logic of block 8 may be executed, in which a graphical user interface (GUI) such as that shown in FIG. 3 can be used by a viewer to add funds to the balance recorded in the purse chip. The user sends funds from his or her bank account to a customer care website in care of a public serial number of the purse chip. For security reasons, the replenishment may be implemented as a "push" from the user's bank account to the purse chip customer care website. The TV can be made to immediately or periodically check the website to see if funds are available for download to purse chip at block 9. If funds are available as indicated by a verification message at block 9, at block 100, the CPU interfaces with the server to receive a payload which is delivered to the purse chip at block 110. At block 120 the purse chip can if desired cryptographically process the payload to add electronic funds to its internal memory. The purse chip can acknowledge the funds reload transaction with an encrypted reply to the server.

The GUIs herein may be tied to, e.g., a pay-per-view ordering channel (e.g., channel 100) or a home shopping network channel so that a viewer may conveniently order items displayed on the channels. To this end, a particular GUI may be presented by the CPU 18 based on information received from the cable head end or Internet, which can prompt the CPU to display a list of appropriate items from which the user can select one or more to purchase using the GUI 38.

The above process for replenishing a purse chip may be applied to replenishing with electronic funds a purse chip embodied by a Felica card using a TV or a computer with which the Felica card can be removably engaged.

More particularly, as recognized herein some laptop computers have readers which may be used to discover how much electronic funding is loaded on the Felica card. As understood herein, it is desirable to permit the computer (or a TV) to also replenish the card with electronic funds. To do this, in one implementation software may be loaded on the TV or PC that proxies a point of service (POS) replenishment terminal. An Internet server interfaces with the TV or PC to simulate a POS terminal to reload a Felica card. This may be accomplished through an SSL connection which may be only 1-sided (server authentication) as is typically done with financial accounts. But the security is not solely with SSL, rather it is with Felica security. Messages are forwarded to/from the Felica card (which embodies an IC). Timing of certain messages can be adjusted to account for delays through the network and/or server. Point-of-Sale (POS) Security can be located in a safe place at the headend such that there need be no POS security located on the TV or PC that could be hacked by someone. The transactions preferably are encrypted transactions.

While the particular IN-CHASSIS TV CHIP WITH DYNAMIC PURSE is herein shown and described in detail, it is to be understood that the subject matter which is encompassed by the present invention is limited only by the claims.

What is claimed is:

1. A TV equipped to transact ecommerce comprising:
a motherboard;
a CPU mounted on the motherboard and executing an ecommerce application;
a purse chip permanently mounted on the motherboard and in communication with the CPU; and
the purse chip holding electronic funds, whereby a user can purchase at least one item using the funds in the purse chip and using the ecommerce application; wherein the CPU and purse chip are mounted on a ball grid array physically coupled to the motherboard, the array establishing at least part of a conductive data path between the CPU and purse chip, the conductive data path being established by pins in the middle of the array, blind vias, and traces on internal layers of the printed circuit board to make probing difficult, wherein the purse chip does not contain personal identifying information or credit card data or debit card data.

2. The TV of claim 1, wherein the CPU presents an on-screen display (OSD) allowing a viewer to replenish funds in the purse chip.

3. The TV of claim 1, wherein the CPU presents an OSD requesting a PIN in order to access the funds on the purse chip.

4. The TV of claim 1, wherein the purse chip is embedded in a package mounted on a surface of a board on which the TV processor is mounted, the purse chip communicating with the processor using an international standards organization (ISO) protocol.

5. The TV of claim 1, wherein the purse chip is directly mounted on a surface of a board on which the TV processor is mounted, the purse chip communicating with the processor using an international standards organization (ISO) protocol.

6. A system, comprising:
a TV tuner;
a TV processor communicating with the TV tuner,
a TV display communicating with the TV processor;
a purse chip communicating with the TV processor and electronically storing information representing a monetary amount; and
a TV chassis holding the tuner, processor, display, and purse chip, wherein the purse chip is replenished with funds from a remote account, the remote account automatically replenishing the purse chip when a monetary amount remaining on the purse chip drops below a predetermined threshold, wherein the purse chip does not contain personal identifying information or credit card data or debit card data, thereby facilitating anonymous purchase of the item.

7. The system of claim 6, wherein a user can purchase at least one item using electronically stored funds in the purse chip.

8. The system of claim 6, wherein the purse chip is a near field communication chip.

9. The system of claim 6, wherein the processor presents a graphical user interface (GUI) on a display of the TV allowing a viewer to replenish funds in the purse chip.

10. The system of claim 6, wherein the processor presents a graphical user interface (GUI) on a display of the TV allowing a viewer to purchase an item using the purse chip.

11. The system of claim 6, wherein the purse chip is embedded in a package mounted on a surface of a board on which the TV processor is mounted, the purse chip communicating with the processor using an international standards organization (ISO) protocol.

12. The system of claim 6, wherein the purse chip is directly mounted on a surface of a board on which the TV processor is mounted, the purse chip communicating with the processor using an international standards organization (ISO) protocol.

* * * * *